May 30, 1967 J. F. TAPLIN 3,321,823
METHOD FOR MANUFACTURING ROLLING DIAPHRAGM DEVICES
Original Filed Jan. 25, 1965
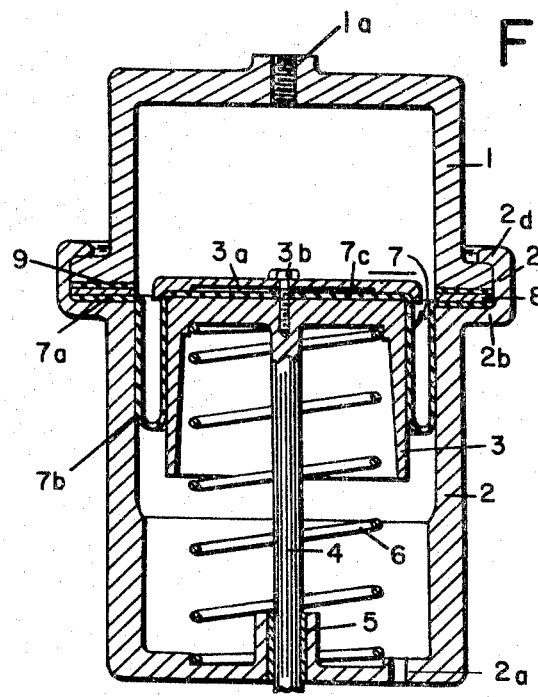
FIG.1
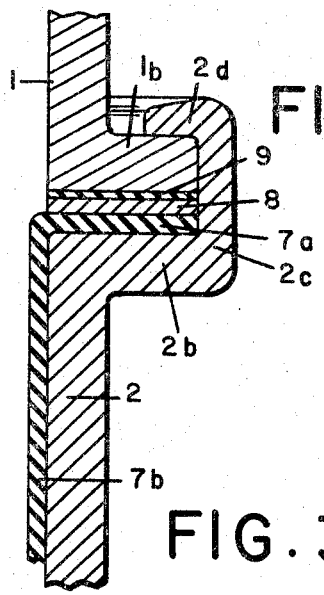
FIG.2
FIG.3
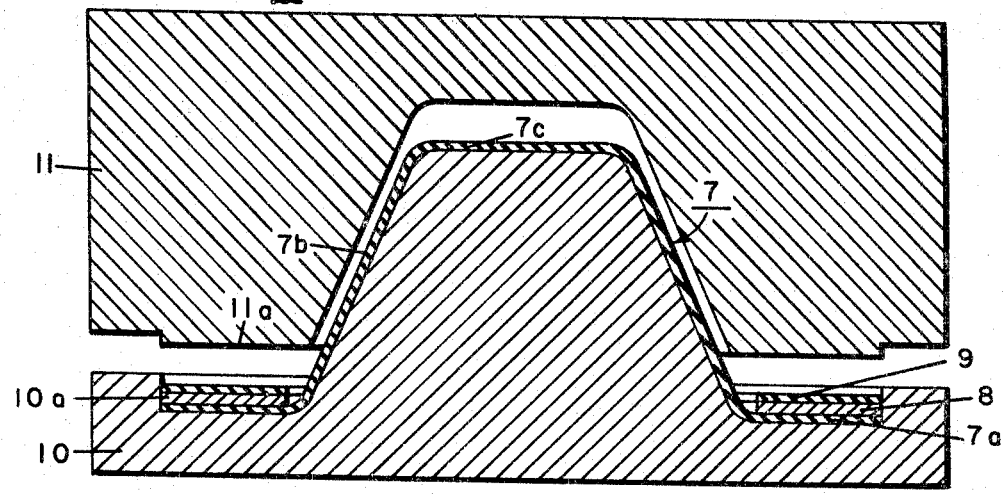
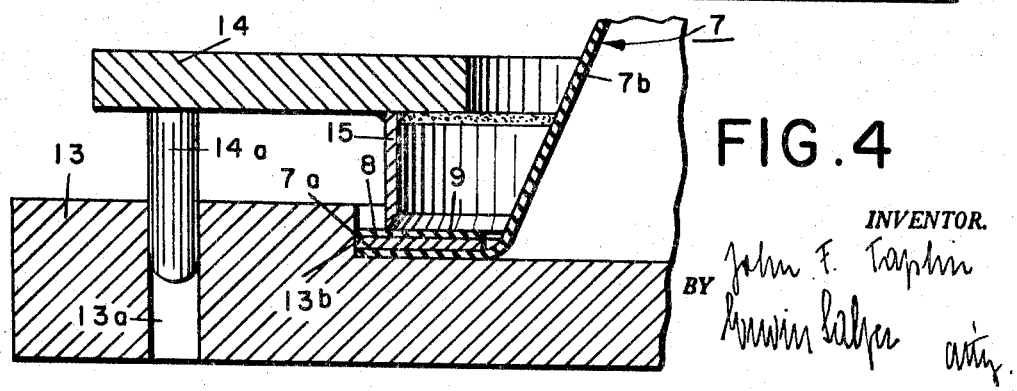
FIG.4
INVENTOR.
BY John F. Taplin

United States Patent Office 3,321,823
Patented May 30, 1967

3,321,823
METHOD FOR MANUFACTURING ROLLING DIAPHRAGM DEVICES
John F. Taplin, 15 Sewall St., West Newton, Mass. 02165
Original application Jan. 25, 1965, Ser. No. 427,847, now Patent No. 3,283,670, dated Nov. 8, 1966. Divided and this application May 25, 1966, Ser. No. 574,483
1 Claim. (Cl. 29—156.4)

This is a division of my copending patent application filed Jan. 25, 1965, Ser. No. 427,847, now Patent No. 3,283,670 for Rolling Diaphragm Devices and Method for Manufacturing the Same.

This invention is concerned with, and relates to, a method of making rolling diaphragm devices.

It is a general object of this invention to provide a method of making greatly improved rolling diaphragm devices.

Among the most important applications of rolling diaphragm devices range fluid pumps and their mechanical reversal, i.e., fluid motors.

It is, therefore, another object of this invention to provide a method of making greatly improved rolling diaphragm devices which lend themselves for application as fluid pumps as well as fluid motors.

All prior art rolling diaphragm devices have a common drawback, or limitation, consisting in that it had heretofore been practically impossible to assure a perfect coaxial alignment of the rolling diaphragm with the cylinder bore in the cylinder body of such devices. In other words, in none of the prior art devices is there an absolute, or even a sufficient assurance that the rolling diaphragm is properly centered in regard to the bore in the cylinder body with which the rolling diaphragm is associated. Such misalignment results in malfunctioning of rolling diaphragm devices, the degree of malfunctioning depending upon various factors. If the rolling diaphragm is but relatively slightly off center, the flex life of the rolling diaphragm may be shortened, yet the device may function satisfactorily for a certain period of time. The reason responsible for the relatively short flex life of the rolling diaphragm may never be known. On the other hand, if a rolling diaphragm is badly misalinged, malfunctioning and serious trouble are likely to occur when, or shortly after, the rolling diaphragm device is placed in service.

It is, therefore, another object of this invention to provide a method of making rolling diaphragm devices wherein centering of the rolling diaphragm is achieved by positive means not subject to human error rather than by the skill of the operator assembling the constituent parts of the rolling diaphragm device.

Another object of this invention is to provide a method making it possible to readily manufacture and assemble the constituent parts of improved rolling diaphragm devices having positively precisely centered rolling diaphragms.

Further objects and advantages of this invention will become apparent as the following description proceeds, and the features of novelty which characterize the invention will be pointed out with particularity in the claims annexed to, and forming part of, this specification.

For a better understanding of the invention reference may be had to the accompanying drawings in which:

FIG. 1 is a diagrammatic vertical section of a rolling diaphragm device embodying the present invention;

FIG. 2 shows a detail of FIG. 1 on a larger scale;

FIG. 3 is a diagrammatic vertical section of a mold used in making a rolling diaphragm for the structure of FIGS. 1 and 2 and also illustrates a step in manufacturing said diaphragm; and FIG. 4 is a diagrammatic vertical section through a trimming device or cutting device used in making a rolling diaphragm for the structure of FIGS. 1 and 2 and also illustrates a step in manufacturing said diaphragm.

Referring now to the drawings, and more particularly to FIGS. 1 and 2 thereof, numeral 1 has been applied to indicate the upper portion of a cylinder body and numeral 2 has been applied to indicate the lower portion of the cylinder body of a rolling diaphragm device. The upper portion 1 is provided with a screw threaded opening 1a and the lower portion 2 is provided with a venting opening 2a. Piston 3 is arranged inside of the cylindrical space defined by parts 1 and 2. There is a gap between the lateral wall of piston 3 and the bore in cylinder body 1, 2 to receive the rolling wall of a rolling diaphgram. Piston rod 4 slidable in bearing 5 integral with the lower portion 2 of the cylinder body 1, 2 is fixedly connected to piston 3. Helical spring 6 rests with one end against the inner surface of the lower portion 2 of cylinder body 1, 2 and with the other end against piston 3 and biases piston 3 in upward direction. Reference character 7 has been applied to generally indicate a rolling diaphragm, preferably made of a fabric reinforced elastomer. The latter comprises radially outer annular flange 7a, a rolling wall 7b forming a convolution, and a radially inner flange 7c. The latter is clamped between the end surface of piston 3 and a retainer plate 3a by means of a screw 3b projecting transversely through retainer plate 3a and piston 3 into piston rod 4. The lower portion 2 of cylinder body 1, 2 is provided with an annular flange 2b, and the radially outer flange 7a of rolling diaphragm 7 rests upon annular flange 2b. Annular member or washer 8 rests upon the radially outer flange 7a of rolling diaphragm 7 and is firmly secured to the latter so as to form an integral part of the rolling diaphragm. Annular member or washer 8 is carefully and precisely centered in respect to rolling diaphragm 7, as will be explained below more in detail. The upper surface of annular member or washer 8 is provided with a layer 9 of relatively soft rubber, or an equivalent elastomer. Flange 2b has an upstanding portion 2c. The radially inner cylindrical surface of upstanding flange portion 2c forms a centering surface for rolling diaphragm 7. To be more specific, the radially outer diameter of the edge portion of annular member or washer 8 is exactly the same as the radially inner diameter of the upstanding portion 2c forming a cooperating centering surface for the radially outer edge of part 8. As a result, the rolling diaphragm 7 is precisely centered in regard to the cylindrical space defined by the two portions 1 and 2 of cylinder body 1, 2, the radially inner surface of upstanding portion 2c or centering ring 2c of flange 2b being precisely centered in regard to the cylindrical space defined by parts 1 and 2. The upper portion 1 of cylinder body 1, 2 is provided with an annular flange 1b which rests upon the upper rubber layer 9 on annular member or washer 8. The upstanding portion or centering ring 2c forms a lip bent over the upper surface of flange 1b and clamping flange 1b against the annular stack or laminate formed by the radially outer flange of 7a of rolling diaphragm 7, washer or annular member 8 and the rubber or other elastomeric overlay 9 of the latter.

FIG. 1 shows the rolling diaphragm device in the neutral plane position which is midway between the upstroke position and the downstroke position. The upstroke position is reached when piston 3 moves upwardly under the joint action of spring 6 and piston rod 4. During the upstroke of piston 3 the portion of the rolling wall 7b of rolling diaphragm 7 which had been in engagement with the wall of part 2 rolls off the wall of part 2 and unto the lateral wall of piston 3. In the upstroke position of piston 3 the entire rolling wall 7a of rolling diaphragm 7 is in physical engagement with the lateral wall of piston 3. During the ensuing downward stroke of piston 3 under the action of piston rod 4 and against the action of spring 6 the rolling wall 7b of rolling diaphragm 7 rolls off the lateral wall of piston 3 unto the lateral wall of portion 2 of cylinder body 1, 2. In the downstroke position of piston 3 all of the rolling wall 7b of diaphragm 7 is transferred from piston 3 unto the lateral wall portion of cylinder body 1, 2.

It will be understood that the presence of a centering ring adapted to cooperate, and cooperating, with the centering structure 8, 9 of rolling diaphragm 7 is an essential element of this invention. The centering ring does not necessarily need to be formed by the upstanding portion of the flange of the lower portion 2 of cylinder body 1, 2. It might be formed, for instance, by a separate annular part having a radially inner projection resting against the upper surface of the flange integral with the upper portion 1 of the cylinder body 1, 2 and having an internal screw-thread cooperating with an external screw-thread on the vertical radially outer edge portion of the flange integral with the lower portion 2 of the cylinder body 1, 2. Such a ring is generally known as threaded bezel ring. The radially outer surface of annular member or washer 8 may be adapted to cooperate with the radially inner surface of such a threaded bezel ring, thus properly centering the rolling diaphragm in regard to the cylinder body 1, 2. In that particular instance it is necessary to properly center the radially inner surface of the threaded bezel ring in regard to cylinder body 1, 2 to make it possible for the radially inner surface of the bezel ring to operate as centering surface for the rolling diaphragm.

The device shown in FIGS. 1 and 2 is predicated on maintaining coaxial relation between the cylindrical centering surface on the upstanding portion 2c of flange 2b and the cylindrical bore in cylinder body 1, 2, and on maintaining coaxial relation between the rolling diaphragm 7 and the annular member or washer 8. The first mentioned condition can readily be met when manufacturing the cylinder body 1, 2. FIGS. 3 and 4 illustrate how to meet the second mentioned condition.

In manufacturing rolling diaphragm devices according to the present invention substantially hat-shaped rolling diaphragms may be used as more fully disclosed and claimed in U.S. Patent 2,849,026 to John F. Taplin. Such a substantially hat-shaped rolling diaphragm may be placed into a conforming mold comprising the two mating mold portions 10 and 11. The lower mold portion 10 includes an annular centering recess 10a coaxial to the hat-shaped portion of diaphragm 7 into which the radially outer flange portion 7a of diaphragm 7 is being fitted. Thereupon the elastomer-surfaced washer or reinforcement member 8 is fitted into centering recess 10a. Washer 8 has exactly the same diameter as centering recess 10a, thus perfectly fitting into the latter when arranged coaxially to the hat-shaped portion of diaphragm 7. Thereupon mold 10, 11 is closed, and reinforcement member 8 and its elastomer overlay 9 permanently affixed to the radially outer flange portion of rolling diaphragm 7. This operation may be achieved in different ways, preferably by the application of heat and pressure. Pressure is exerted upon flange 7a, washer 8 and its overlay 9 by a projection 11a forming part of the upper mold portion 11. Washer 8 is made of a sheet material having sufficient dimensional stability to form at the edges thereof a precise positioning abutment. Washer 8 may, for instance, be made of a suitable fiber-reinforced synthetic resin. It may be permanently affixed or laminated to flange 7b of diaphragm 7 by vulcanization, or by means of a suitable adhesive. The tolerance between washer 8 and the centering recess 10a in mold 10, 11 into which flange 7b and washer 8 are fitted may be in the order from .015″ to .050″. After the washer or reinforcement member 8 has been firmly affixed or laminated to flange 7b of diaphragm 7 the latter, including washer or reinforcement member 8, is removed from mold 10, 11.

The next step consists in trimming the washer or reinforcement member 8—and the radially outer flange 7a of diaphragm 7—to the right size, i.e., to the size of the alignment surface on the alignment ring of the rolling diaphragm device in combination with which the particular rolling diaphragm is intended to be used. This is achieved by means of a trimming device of which the left portion is diagrammatically shown in FIG. 4, the right portion being broken away in that figure since it is being identical to its left portion.

The trimming device shown in FIG. 4 comprises a lower portion or cutting plate 13, and an upper portion or knife carrier 14. Cutting plate 13 is provided with bores 13a—of which but one is shown in FIG. 4—engaged by dowel pins 14a. Cutting board 13 is further provided with a circular centering recess 13b which is arranged in coaxial relation to a circular cutting knife 15 supported by knife carrier 14. Bores 13a in cutting plate 13 and dowels 14a in knife carrier 14 rigorously maintain the coaxial relation of circular centering recess 13b and of the circular cutting edge of the circular cutting knife 15. By moving knife carrier 14 downwardly—against the action of a biasing spring mechanism (not shown)—the laminate 7a, 8, 9 is trimmed to the exact circular size required. Assuming it is desired to provide a rolling diaphragm for the structure of FIGS. 1 and 2, this requires cutting the laminate 7a, 8, 9 to the size of the inner diameter of extension 2c of flange 2b of the portion 2 of cylinder body 1, 2. The trimmed diaphragm 7 is then removed from the trimming or cutting device shown in FIG. 4 and inserted into the structure of FIGS. 1 and 2. In so doing physical engagement is established between the radially outer trimmed edge of laminate 7a, 8, 9 and radially inner alignment surface of part 2c. Now rolling diaphragm 7 is perfectly centered by abutting action and positively maintained in its centered position. Lip 2d may now be swaged to clamp annular laminate 7a, 8, 9 in its position between flanges 1b and 2b.

It will be understood that although but one embodiment of the invention has been shown and described in detail, the invention is not limited thereto, and that the illustrated embodiment may be modified, or other embodiments made, without departing from the spirit and scope of the invention as set forth in the accompanying claim.

I claim as my invention:

A method for manufacturing rolling diaphragm devices including an alignment ring having a cylindrical alignment surface of predetermined inner diameter being arranged in coaxial relation to the bore in the cylinder body of the rolling diaphragm device, said method including the steps of:

(a) placing a substantially hat-shaped rolling diaphrag of a fabric reinforced elastomer into a conforming mold and fitting a radially outer flange of said rolling diaphragm into a circular centering recess defined by said mold;

(b) superimposing upon said radially outer flange of said rolling diaphragm while in said mold an elastomer-surfaced annular reinforcement member having the same diameter as said centering recess defined by said mold, simultaneously fitting said reinforcement member into said centering recess of said mold, and thereafter permanently affixing said reinforcement member to said flange of said rolling diaphragm while said rolling diaphragm still is in said mold;

(c) removing said rolling diaphragm from said mold with said reinforcement member permanently affixed to said radially outer flange of said rolling diaphragm, fitting said reinforcement member into a circular centering recess of a trimming device, and thereafter trimming said reinforcement member to the exact diameter of said alignment surface on said alignment ring; and (d) establishing thereafter physical engagement between the radially outer trimmed edge of said reinforcement member and said alignment surface on said alignment ring.

References Cited

UNITED STATES PATENTS

| | | | |
|---|---|---|---|
| 1,294,486 | 2/1919 | Kuen | 29—445 |
| 1,939,683 | 12/1933 | Foehr | 156—267 X |
| 2,296,724 | 9/1942 | McCormack | 29—481 |
| 2,564,693 | 8/1951 | Hornbostel | 92—103 |
| 2,642,090 | 6/1953 | Barr | 29—156.4 X |
| 2,998,343 | 8/1961 | Gold et al. | 92—103 X |

CHARLIE T. MOON, *Primary Examiner.*